Jan. 21, 1958  R. L. MILLS  2,820,878
LUNCH BOX
Filed Aug. 3, 1955
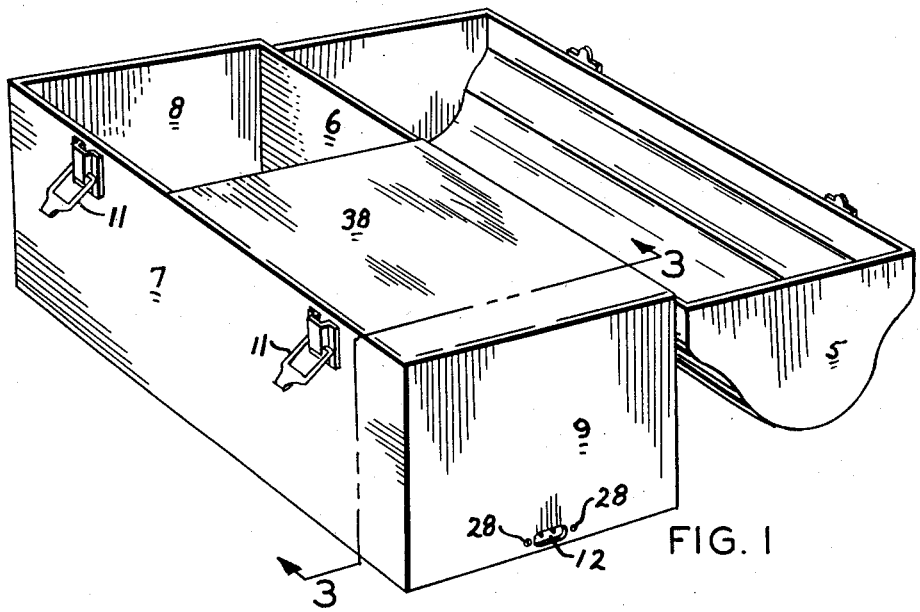
FIG. 1
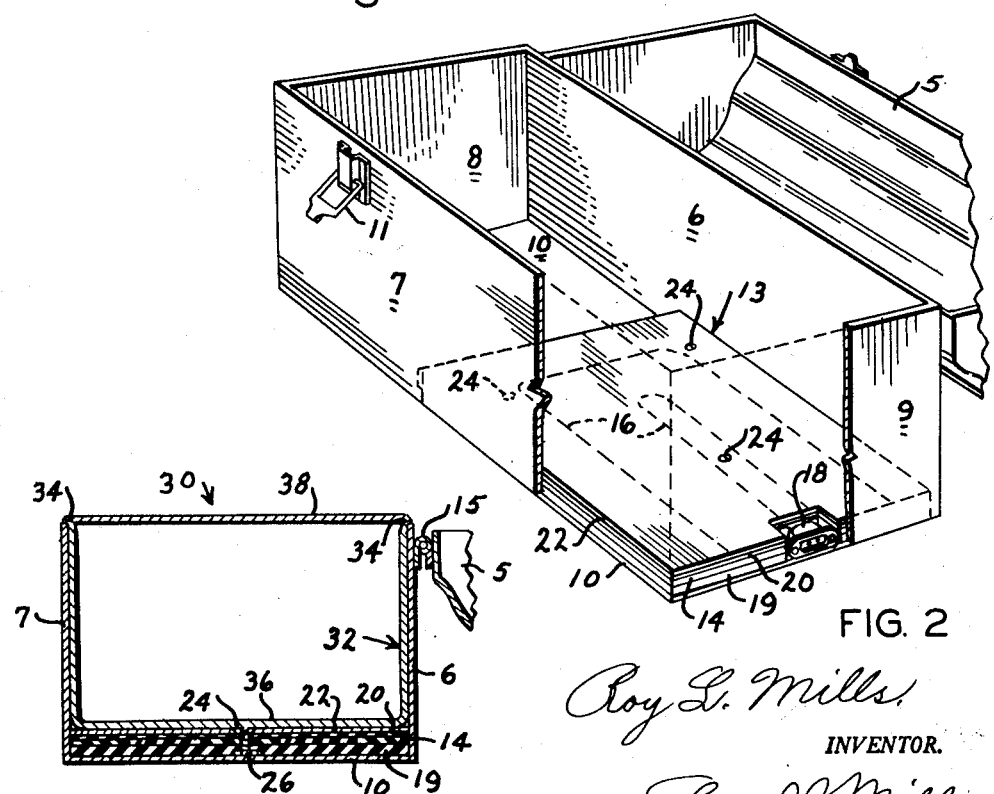
FIG. 2
FIG. 3
Roy L. Mills,
INVENTOR.
BY Loyd J. Miller
ATTORNEY 2,820,878

LUNCH BOX

Roy L. Mills, Norman, Okla.

Application August 3, 1955, Serial No. 526,119

2 Claims. (Cl. 219—35)

The present invention relates to a portable food container, and more particularly to a lunch box adapted to be carried by industrial workers which contains a means for providing hot lunches.

The medical profession has long recognized the desirability of providing a warm meal at noontime as an aid to the health and efficiency of the workingman. A large number of industrial workers carry a prepared lunch in lunch boxes for reasons of convenience and economy. Conventional lunch boxes, as a rule, require the preparation of cold lunches, with no provision being made, other than a conventional thermos or vacuum bottle, for providing anything warm during the mealtime.

It is therefore the primary object of this invention to provide a lunch box which may be electrically connected to any standard convenient outlet which will quickly heat the food as desired, but it can also be used without such pre-heating.

At the present time many foods are prepared which are partially "pre-cooked" and requires only a small amount of heating or cooking to render them edible.

It is therefore another important object of my invention to provide a lunch box having a housing adapted for receiving a tray which contains such "pre-cooked" foods which may be "finish cooked" just preceding the worker's mealtime.

The present invention accomplishes these and other purposes by providing a lunch box of conventional design which includes an electrical resistance unit flatly connected to the bottom of the box adjacent one end. An aperture is placed in the said one end of the box adjacent its bottom in co-operative alignment with an electrical receptacle connected to the heating unit. A rectangular tray is closely received by the walls of the lunch box above the heating unit. The uppermost edges of the walls of the tray seal with the upper edges of the box to retain a maximum amount of the heat generated within the tray and thus heat or cook the food contained therein as desired.

Other objects will be apparent from the following description when taken in conjunction with the accompanying single sheet of drawings, wherein:

Figure 1 is a perspective view of the lunch box with the lid in open position;

Figure 2 is a fragmentary perspective view similar to Fig. 1, with a portion of the box cut away, illustrating the manner of placing the heating unit therein; and Figure 3 is a vertical cross-sectional view taken substantially along line 3—3 of Fig. 1.

Like characters of reference designate like parts in those figures of the drawings in which they occur.

In the drawings:

*Box construction*

The lunch box housing illustrated herein is more or less standard insofar as the construction of the same is concerned. It comprises a top 5 having a handle, not shown, by which the box is carried, and side walls 6 and 7, end walls 8 and 9, and a bottom 10. At their points of juncture the walls and bottom are integrally connected to form a tight container. The top 5 is formed to receive a conventional vacuum bottle, not shown, and is longitudinally connected to the outer surface of the wall 6 by a hinge 15 for closing the lunch box. A pair of latching members 11 are secured to the front 7 for holding the top or lid 5 closed. At a selected point adjacent its lower edge the end wall 9 is provided with an aperture 12 for the purposes more fully explained hereinbelow.

*Food heating unit*

The food heating unit 13 comprises essentially a flat plate of non-conductive material 14 from which is cut a substantially U-shaped section 16 as illustrated in dotted lines Fig. 2, and around which is helically wound electrical resistance wiring, not shown. The ends of the resistance wiring are connected to an electrical receptacle 18 located at one end of the unit. The U-shaped section 16 is then replaced in its original position. A sheet of heat insulating material 19 such as asbestos, or the like, of selected thickness, is placed within the box on the bottom 10 and adjacent the end 9. The electrical resistance wire-wound plate 14 is placed on top of the heat insulation 19. A comparatively thin sheet of electrical insulating material, such as mica 20, is placed on top of the plate 14. A heat conducting cover or top 22, preferably of metal, overlies the mica 20. The length and width of the four elements comprising the heating unit 13, the asbestos 19, the resistance wire-wound sheet 14, the sheet of mica 20, and the heat conducting top 22, are all substantially equal and are closely received by the side walls 6 and 7 and adjacent the end wall 9 and are flatly disposed on the bottom 10. The unit 13 is connected to the bottom 10 by bolts or screws 24 and nuts 26. The nuts 26 are rigidly connected to the bottom 10 as by sweat soldering. The receptacle 18 is rigidly connected to the end wall 9 in co-operating relation with the aperture 12 hereinabove referred to by screws 28.

*Food tray*

The food tray or container 30 comprises a rectangular box-like upwardly open receptacle 32 which is closely received within the lunch box, and has the uppermost top edges of its walls flanged or flared outward slightly, as at 34, to overlie the uppermost edges of the walls 6 and 7 and end wall 9 of the lunch box, for causing a tight connection therewith and retaining the heat within the tray. The length and width of the tray is substantially equal with relation to the heating unit 13 with the bottom 36 flatly disposed on the heating unit top 22. The tray 30 has a cover or lid 38 for closing the same. Partially pre-cooked foods may be packaged in closed or sealed containers, said containers substantially equal in overall dimensions with the tray 30, and placed within the lunch box and the finishing of the cooking completed by the heating unit 13.

*Operation*

The operation of the lunch box is obvious from the foregoing description. The selected foods which are to be finish-cooked are placed within the tray 30 which is placed within the lunch box above the heating unit 13. Shortly before mealtime the box is connected with a source of electrical current by plugging an extension cord, not shown, into the receptacle 18 and permitted to remain there a sufficient length of time.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An electrically heated lunch box, comprising: a housing having a back, front and end walls integrally connected to a bottom, and having a top hingedly connected to said back wall for closing the housing; a rectangular substantially flat electrical resistance heating unit flatly disposed within said housing adjacent one end wall, said unit having an electrical outlet receptacle connected to said one end wall adjacent the lower edge thereof, said one end wall having an aperture co-operatingly surrounding the opening of said receptacle; a rectangular food tray closely received by said housing above said heating unit, the uppermost edges of said tray flared outwardly for sealing with the upper edges of said housing for preventing the rapid dissipation of heat; and a flat rectangular lid overlying the flared edges of said tray for closing the same, the lowermost surface of said top bearing against the upper surface of said lid when said lid is in closed position.

2. An electrically heated lunch box, comprising: a housing having a back, front and end walls integrally connected to a bottom, and having a top hingedly connected to said back wall for closing the housing; a rectangular substantially flat electrical resistance unit flatly disposed on said bottom within said housing adjacent one end wall, said unit having an electrical outlet receptacle connected to said one end wall adjacent the lower edge thereof, said one end wall having an aperture co-operatingly surrounding the opening of said receptacle; a heat insulating pad flatly disposed on said bottom beneath said heating unit; a heat conducting plate rigidly carried flatly by the upper surface of said heating unit; a rectangular food tray closely received by said housing above said heating unit, the uppermost edges of said tray flared outwardly for sealing with the upper edges of said housing and preventing rapid dissipation of heat; and a flat rectangular lid overlying the flared edges of said tray for closing the same, the lowermost edges of said top bearing against the upper surfaces of two sides and one end of said lid when said top is in housing closing position.

References Cited in the file of this patent

UNITED STATES PATENTS

| | | |
|---|---|---|
| 1,412,761 | Tingstrom | Apr. 11, 1922 |
| 2,295,221 | King | Sept. 8, 1942 |
| 2,504,132 | Jones | Apr. 18, 1950 |
| 2,505,405 | Jarboe | Apr. 25, 1950 |
| 2,545,127 | Wnuk | Mar. 13, 1951 |